Sept. 15, 1959  W. E. COWLEY ET AL  2,904,086
JOINTER-PLANER BLADE
Filed July 12, 1957  2 Sheets-Sheet 1
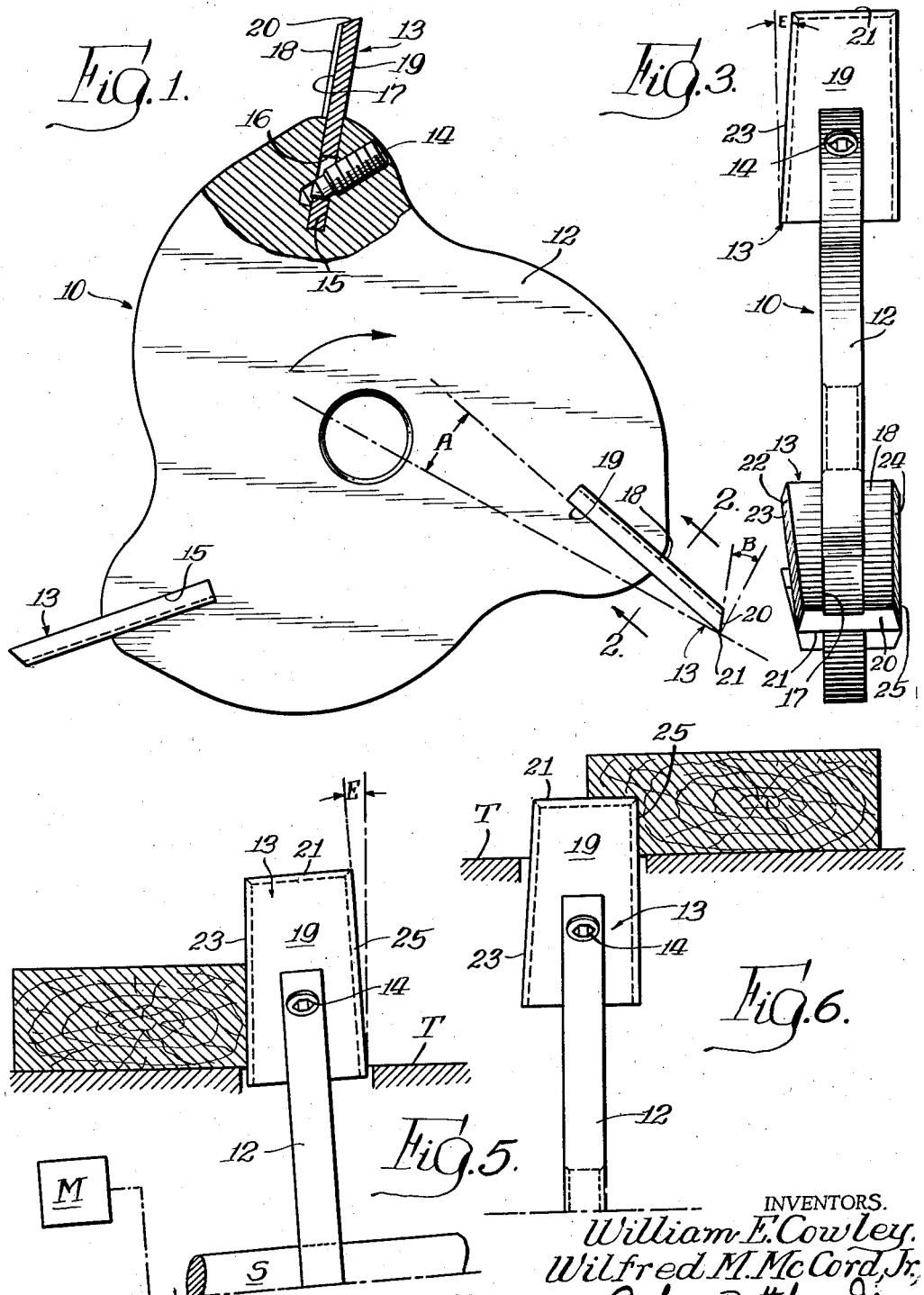
INVENTORS.
William E. Cowley.
Wilfred M. McCord, Jr.
By Brown, Jackson, Boettcher & Dienner
Attys.

Sept. 15, 1959     W. E. COWLEY ET AL     2,904,086
JOINTER-PLANER BLADE
Filed July 12, 1957     2 Sheets-Sheet 2
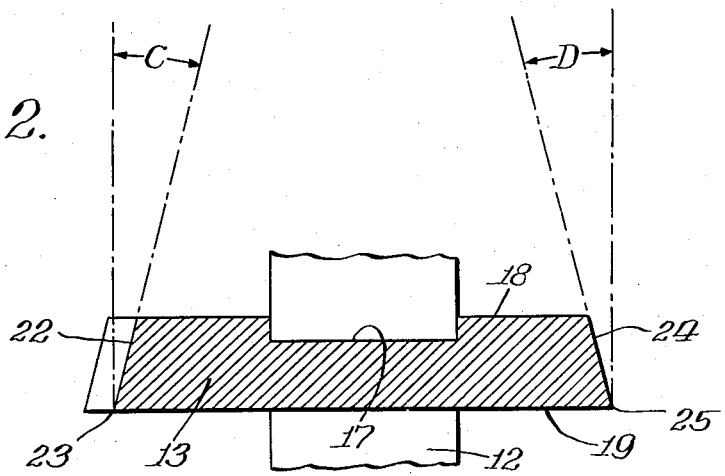
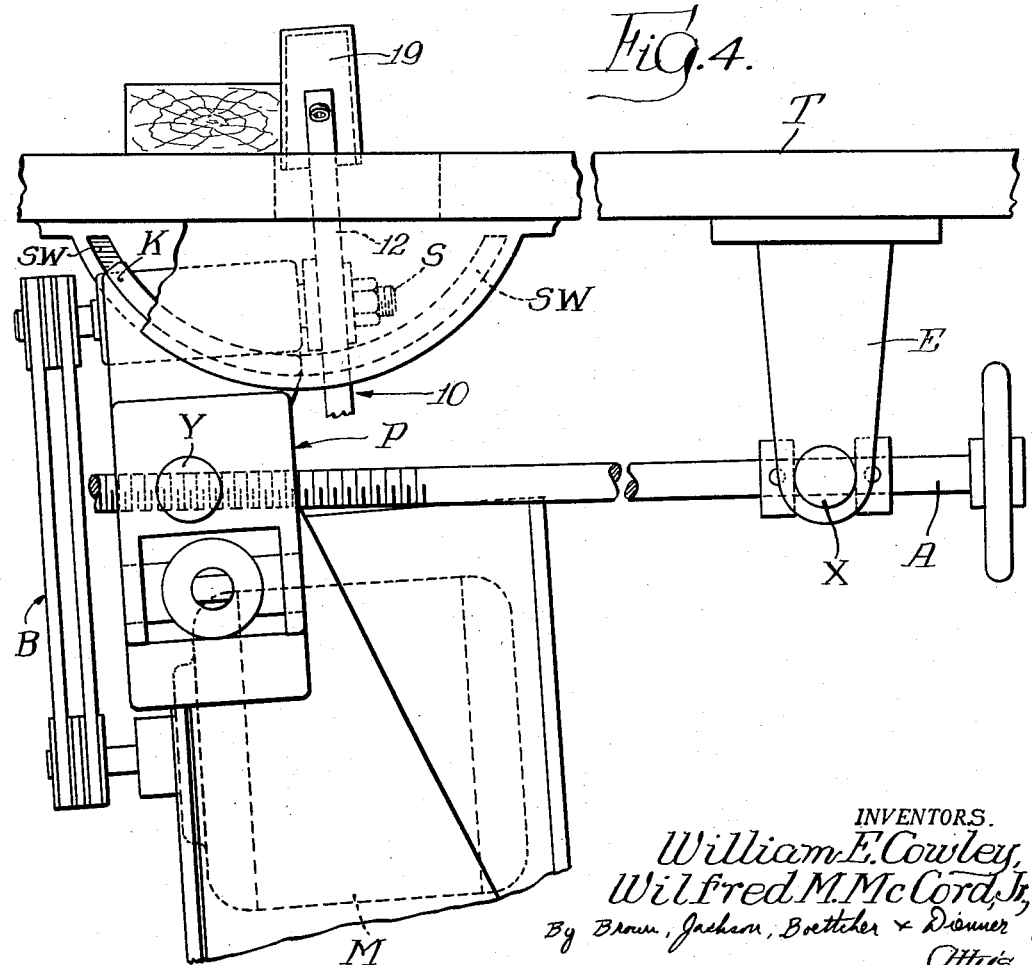
INVENTORS.
William E. Cowley,
Wilfred M. McCord, Jr.,
By Brown, Jackson, Boettcher & Dienner
Atty's.

United States Patent Office 2,904,086
Patented Sept. 15, 1959

2,904,086

JOINTER-PLANER BLADE

William E. Cowley and Wilfred M. McCord, Jr., Louisville, Ky., assignors to American Saw and Tool Company, Louisville, Ky., a corporation of Kentucky Application July 12, 1957, Serial No. 671,590

17 Claims. (Cl. 144—229)

This invention relates in general to jointing and planing of woods of various kinds and particularly to a new and improved jointer-planer tool and blade.

Heretofore, a majority of jointer and planer tools would not place a good finish on the wood and would cause excessive splintering on either the top or the bottom edges. Furthermore, prior tools of this type had a tendency to cause the work piece to work away from the operator, would place excessive bearing loads on the machines, lacked sufficient capacity to joint commercial material in one application, and perhaps most important of all, were not particularly adaptable to table saw applications.

Accordingly, it is general object of our invention to provide a new and improved jointer-planer tool which will overcome the deficiencies of prior art devices.

We propose to accomplish this general object by the provision of a new and improved jointer-planer blade having particularly angled cutting edges and surfaces secured to a tool head thus providing a tool capable of jointing, planing, and rabbeting and which is particularly useful in table saw applications.

We have found that our invention will enable an operator to joint the edges of wide or narrow boards in the flat position on the table top, uniform in width, with a finish on all edges of the broad, smoother than sanding, and with a finish comparable to that done by a hand plane without the inaccuracies of a hand plane. We have also found that we can make long and short glue joints and bevel corners in such a manner that sanding is eliminated.

Accordingly, another object of our invention is to provide a new and improved jointer-planer tool permitting an operator to joint edges of wide and narrow boards in a flat position on top of a table absolutely uniform in width with a finish smoother than sanding.

Still another object of our invention is to provide a new and improved jointer-planer tool which will enable an operator to make long and short glue joints in such a manner that sanding is eliminated before finishing.

Still another object of our invention is the provision of a cutter blade of a particular type capable of performing the functions above described and particularly useful in table saw applications.

Additional objects and advantages of our invention will become apparent to those skilled in the art in the light of the following specification and the accompanying drawings forming a part hereof wherein:

Fig. 1 is an enlarged plan view partially broken away showing to advantage a new and improved planer and jointer tool comprising a head with new and improved cutter blades secured thereto;

Fig. 2 is an enlarged sectional view of one of the cutter blades taken along line 2—2 of Fig. 1 and looking in the direction of the arrows;

Fig. 3 is a side view showing to advantage the various cutting edges of the blades and their angularity with respect to the head;

Fig. 4 is a fragmented partial view of a table saw showing a planer and jointer tool according to the invention mounted on the arbor thereof;

Fig. 5 is a partial sectional view showing to advantage the head and one of the blades with the table saw arbor tilted for jointing;

Fig. 6 is a partial view in section showing to advantage the blade with the table saw arbor straight for rabbeting.

Turning now to the drawings, there is illustrated our new and improved planer and jointer tool, indicated in its entirety as 10, adapted to be rotatably mounted on a shaft S of a table saw of the conventional type having a table top T (Fig. 4). Rotation of the shaft may be accomplished by any suitable source of power such as an electric motor M. In order that said shaft S may be tilted with respect to the top T of the table saw, a member P is provided as a common support for both motor M and shaft S, and, as shown in Fig. 1, said support P is suspended from the top T by means of key portions K provided thereon which slidingly engage within a pair of spaced parallel related arcuate slideways SW provided in a member secured to the underside of said top T. By adjusting the position of support P along said arcuate slideway SW, the angle at which shaft S is tilted may be varied. This is conveniently obtained by means of an adjustment member A which extends through a part X rotatably mounted in a member C secured to top T, said adjustment member A being threadedly connected into a further part Y rotatably supported in support P. Thus, in accordance with the direction in which the handle of adjustment member A is rotated, support P may be drawn toward and moved away from part X and thereby control the angle of tilt of shaft S. Any other convenient means known in the art may be utilized for varying the angle at which shaft S is tilted relative to the top of the table saw.

In Fig. 1 there is illustrated an irregularly shaped cutter blade holder 12 with a plurality of blades or cutters, indicated in their entirety as 13, affixed to the holder 12 by an conventional and convenient means, such as by set screws 14 which cooperate with slots 15 in the holder, and with apertures 16 and slots 17 in the cutters 13 (see Fig. 2).

Referring to Figs. 1 and 2, it is important to note that each of the cutter blades 13 has a plurality of cutting edges formed by surfaces angularly disposed with respect to the front and back faces 18, 19 of the blades and that some of the surfaces are still further angularly disposed with respect to the axis of rotation of the holder 12, as more clearly shown in Fig. 3. It is to be noted also that the cutter blades themselves are disposed at an angle with respect to the center of the tool holder as clearly shown in Fig. 1. These various angles are important to accomplish the desired results, as will be explained in detail hereinafter.

Referring now in particular to the various angles, attention is invited to Fig. 1 where there is shown an angle designated as "A" between the center of the tool holder 12 and the face 19. This angle, generally known as a hook, may be varied from a +15° to a —10° with respect to the center of the holder. Actually, however, it is preferred that this angle "A" vary only from a +5° to a +15°. Experience has shown that if the angle is 0°, that is, if the cutter is radial with respect to the center of the head 11, the cutter will pull the grain of the wood. Generally speaking, the greater the angle (+) or (—), the smoother the cut, but beyond the limits of +15° to —10°, excessive splintering and a tendency for the tool to lift the wood from the table top will occur.

The angle, identified as "B" in Fig. 1, formed by the surface 20, parallel to the axis of rotation of the head, which forms a cutting edge 21 with face 18, is conventional for corner cutting. Sufficient angularity to prevent burning or digging of the wood is within the range of +8° to +15° from a line perpendicular to a radius line of the holder 12.

An important angle in our invention is angle "C" (see Fig. 2) formed by the angular disposition of surface 22 with respect to the face 19 to form cutting edge 23. It is preferred that this angle range from +8° to +10° from a line perpendicular to face 19 (or with the range of 80° to 82° with respect to face 19), although experience has shown that satisfactory work can be obtained if this angle is within the range of +6° and +12° (or within the range of 78° to 84° with respect to face 19). These values will result in a good finish on the wood, free the cutting tool during operation with no tendency to burn, and produce only a very slight side pressure making it easier to feed the wood through the machine. Experience has shown also that when this angle is too small, a burning and excessive side pressure results, making it difficult to feed the work through the machine, and a bad joint line is produced because of the springing of the various parts making long scallops in the work. Likewise, when the angle is too high, excessive lifting of the grain of the wood results and it is not practical to work against the grain of the wood.

Angle "D," shown in Fig. 2, is on the other side of the blade opposite from angle "C" and is formed by the angular disposition of surface 24 with respect to face 19 to form cutting edge 25. This angle may be the same as or in the range of angle "C" depending on the use of the particular tool. In the usual table saw applications, this angle can be conventional, so that the blade may be used for rabbeting as shown in Fig. 5 of the drawings.

As shown in Fig. 3, angle "E" formed by the angular disposition of surface 22 and cutting edge 23 with respect to the transverse axis of the holder 12 is one of the most important angles of our tool, since it determines the manner in which the cutting edges of the blades contact the work piece. As clearly shown in Fig. 3, it is to be noted that the angular disposition of the cutting edge 23 will perform the function of a conical cutter in its approach to the work piece. It is preferred that the angle "E" is 3° for the best results although experience has shown that satisfactory work can be done when the angle "E" is in the range of 2° to 4°. Otherwise stated, it is preferable that the cutting edge 23 on the blade be at an angle of 93° with regard to cutting edge 21, although it may be formed with a range of 92° to 94°. When the angle is greater than 4°, the finish on the work is poor and there is a tendency to beat the wood due to the cutting edge striking against the wood from the side. Likewise, when the angle is less than 2°, the head will work in the same manner as a conventional cutter with no angle.

As shown in Fig. 5, our tool will perform jointer work when the arbor is tilted, as shown, so that the cutting edge 23 is perpendicular to the work table, and, as shown in Fig. 6, when the opposite cutting edge 25 is perpendicular to the table, our tool will perform the rabbeting operation. It is important to note in both of these figures that the work piece may be held flat on the table so that the edges of both wide and narrow boards may be jointed with more of a certainty that the edges are uniform than can be expected from a conventional jointer.

From the above description, it can be seen that we have described a new and improved jointer-planar tool utilizing a new and improved jointer-planer blade which combines to effect a conical planer which can be used in various types of work, such as jointing and rabbeting, by the position of the holder with respect to the top of a conventional saw table. This tool enables an operator, among other things, to make long and short glue joints and places a finish on the jointed edges of a board which is smoother than sanding. This finish is comparable to a hand plane without the inaccuracies of a hand plane and the tool can be used for beveling corners, etc., which will eliminate sanding before finishing.

While we have described this invention in connection with only one embodiment thereof, it is to be understood that this is by way of illustration and not by way of limitation and the scope of this invention is to be defined solely by the appended claims, which should be construed as broadly as the prior art will permit.

We claim:

1. A jointer-planer blade adapted to be inserted in a rotatable tool holder and rotated thereby comprising a first cutting edge and a second cutting edge disposed at an obtuse angle with respect to the first cutting edge so that the second cutting edge may perform as a conical cutter in its approach to and contact with a work piece with said first edge held coaxial with the axis of rotation of said tool holder whereby the work piece when cut will have a smooth finish and the work piece will not be beat during the cutting operation.

2. A jointer-planer blade adapted to be inserted in a rotatable tool holder and rotated thereby comprising a first cutting edge and a second cutting edge disposed at an obtuse angle of 93° with respect to the first cutting edge so that the second cutting edge may perform as a conical cutter in its approach to and contact with a work piece with said first edge held coaxial with the axis of rotation of said tool holder whereby the work piece when cut will have a smooth finish and the work piece will not be beat during the cutting operation.

3. A jointer-planer blade adapted to be inserted in a rotatable tool holder comprising a first cutting edge, and a second cutting edge disposed at an obtuse angle within the range of 92° to 94° with respect to the first cutting edge so that the second cutting edge may perform as a conical cutter in its approach to and contact with a work piece with said first edge held coaxial with the axis of rotation of said tool holder whereby the work piece when cut will have a smooth finish and the work piece will not be beat during the cutting operation.

4. A jointer-planer blade comprising a first cutting edge, a second cutting edge disposed at an obtuse angle of 93° with respect to the first cutting edge, and a third cutting edge disposed perpendicular to the first cutting edge.

5. A jointer-planer blade comprising a first cutting edge, a second cutting edge disposed at an obtuse angle within the range of 92° to 94° with respect to the first cutting edge, and a third cutting edge disposed perpendicular to the first cutting edge.

6. A jointer-planer blade comprising a face, a first surface disposed at an angle with respect to said face forming a first cutting edge, and a second surface disposed at an angle within the range of 80° to 82° with respect to said face and at an angle with respect to said first surface forming a second cutting edge disposed at an obtuse angle with respect to the first cutting edge.

7. A jointer-planer blade comprising a face, a first surface disposed at an angle with respect to said face forming a first cutting edge, and a second surface disposed at an angle within the range of 78° to 84° with respect to said face and at an angle with respect to said first surface forming a second cutting edge disposed at an obtuse angle with respect to the first cutting edge.

8. A jointer-planer blade comprising a face, a first surface disposed at an angle with respect to said face forming a first cutting edge, a second surface disposed at an angle within the range of 80° to 82° with respect to said face and at an angle with respect to said first surface forming a second cutting edge disposed at an obtuse angle with respect to the first cutting edge, a third cutting edge disposed perpendicular to the first cutting edge.

9. A jointer-planer blade comprising a face, a first surface disposed at an angle with respect to said face forming a first cutting edge, a second surface disposed at an angle within the range of 78° to 84° with respect to said face and at an angle with respect to said first surface forming a second cutting edge disposed at an obtuse angle with respect to the first cutting edge, and a third cutting edge disposed perpendicular to the first cutting edge.

10. A jointer-planer tool comprising a rotatable holder, cutter blades attached to said holder, each cutter blade having a first cutting edge parallel to the rotatable axis of the holder and a second cutting edge disposed at an angle of 3° with respect to a line normal to said rotatable axis.

11. A jointer-planer tool comprising a rotatable holder, cutter blades attached to said holder, each cutter blade having a cutting edge parallel to the rotatable axis of the holder and a second cutting edge disposed at an angle within the range of 2° to 4° with respect to a line normal to said rotatable axis.

12. A jointer-planer tool comprising a rotatable holder, cutter blades attached to said holder, each cutter blade having a first cutting edge, a second cutting edge disposed at an angle with respect to a line normal to the rotatable axis of the holder and a third cutting edge perpendicular to the first cutting edge.

13. A jointer-planer tool comprising a rotatable holder, cutter blades attached to said holder, each cutter blade having a face, a first surface disposed at an angle with respect to said face forming a first cutting edge parallel to the rotatable axis of the holder, and a second surface disposed at an angle within the range of 80° to 82° with respect to said face and at an angle with respect to said first surface forming a second cutting edge disposed at an angle with respect to a line normal to said rotatable axis.

14. A jointer-planer tool comprising a rotatable holder, cutter blades attached to said holder, each cutter blade having a face, a first surface disposed at an angle with respect to said face forming a first cutting edge parallel to the rotatable axis of the holder, and a second surface disposed at an angle within the range of 78° to 84° with respect to said face and at an angle with respect to said first surface forming a second cutting edge disposed at an angle with respect to a line normal to said rotatable axis.

15. A jointer-planer tool comprising a rotatable holder, cutter blades attached to said holder, each cutter blade having a face, a first surface disposed at an angle with respect to said face forming a first cutting edge parallel to the rotatable axis of the holder, and a second surface disposed at an angle with respect to said face and at an angle within the range of 80° to 82° with respect to said first surface forming a second cutting edge disposed at an angle of 30° with respect to a line normal to said rotatable axis.

16. A jointer-planer tool comprising a rotatable holder, cutter blades attached to said holder, each cutter blade having a face, a first surface disposed at an angle with respect to said face forming a first cutting edge parallel to the rotatable axis of the holder, and a second surface disposed at an angle with respect to said face and at an angle within the range of 78° to 84° with respect to said first surface forming a second cutting edge disposed at an angle within the range of 2° to 4° with respect to a line normal to said rotatable axis.

17. In a table for a saw having a shaft powered by a motor and a table top, a jointer-planer tool comprising a rotatable holder mounted on said shaft and extending through said top, cutter blades attached to said holder, each cutter blade having a first cutting edge parallel to the rotatable axis of the holder and a second cutting edge disposed at an angle with respect to a line normal to said rotatable axis.

References Cited in the file of this patent

UNITED STATES PATENTS

| 943,102 | Schleicher | Dec. 14, 1909 |
| 1,526,660 | Bowers | Feb. 17, 1925 |
| 2,041,806 | Bartol | May 26, 1936 |
| 2,364,481 | Seiler | Dec. 5, 1944 |
| 2,473,952 | Horr | June 21, 1949 |
| 2,731,991 | Cowley | Jan. 24, 1956 |
| 2,744,548 | Stephenson et al. | May 8, 1956 |

FOREIGN PATENTS

| 8,154 | Great Britain | of 1901 |
| 183,511 | Great Britain | July 28, 1922 |
| 415,865 | France | July 23, 1910 |